J. H. FAUSSETT.
VEHICLE TIRE.
APPLICATION FILED SEPT. 13, 1917.

1,284,278.

Patented Nov. 12, 1918.

Inventor:
John H. Faussett.
by his Attorneys.
Howson & Howson

J. H. FAUSSETT.
VEHICLE TIRE.
APPLICATION FILED SEPT. 13, 1917.

1,284,278.

Patented Nov. 12, 1918.
4 SHEETS—SHEET 3.

Inventor:
John H. Faussett.
by his Attorneys
Howson & Howson

J. H. FAUSSETT.
VEHICLE TIRE.
APPLICATION FILED SEPT. 13, 1917.
1,284,278.
Patented Nov. 12, 1918.
4 SHEETS—SHEET 4.
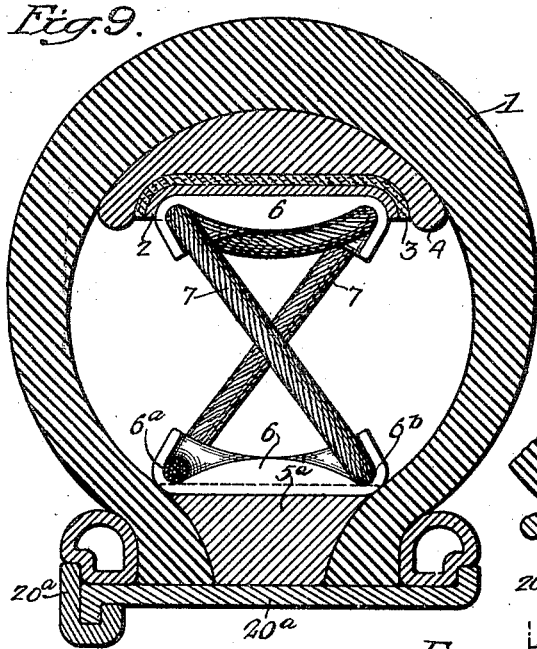
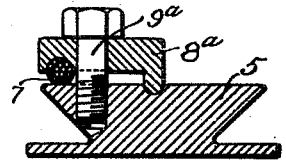
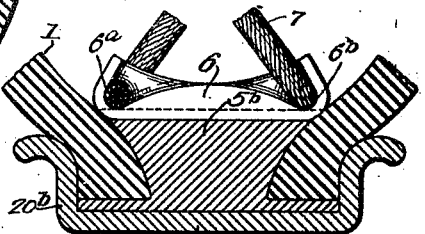
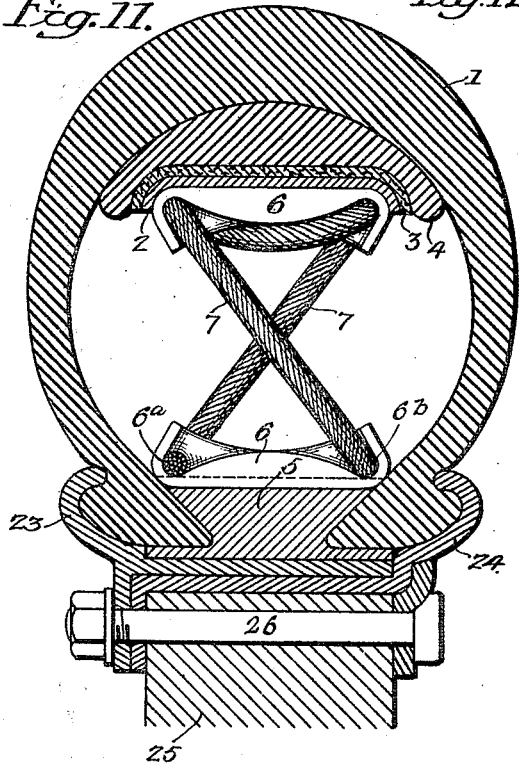
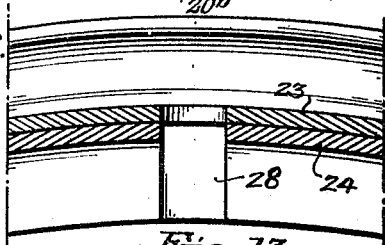
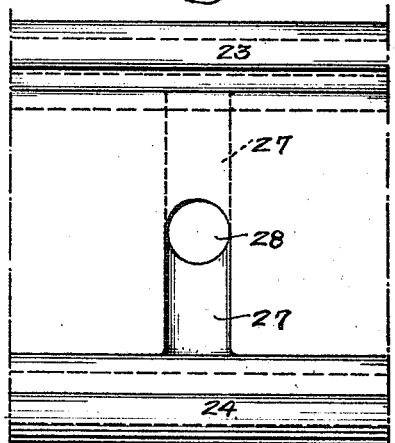

UNITED STATES PATENT OFFICE.

JOHN H. FAUSSETT, OF PHILADELPHIA, PENNSYLVANIA.

VEHICLE-TIRE.

1,284,278.  Specification of Letters Patent.  Patented Nov. 12, 1918.

Application filed September 13, 1917. Serial No. 191,126.

*To all whom it may concern:*

Be it known that I, JOHN H. FAUSSETT, a citizen of the United States, residing in Philadelphia, Pennsylvania, have invented Vehicle-Tires, of which the following is a specification.

My invention relates to vehicle wheels, and more specifically to wheels such as used on automobiles and the like. The object of my invention is to provide a resilient tire which may take the place of the pneumatic tire now in general use. Another object of my invention is to so construct the tire that the standard tire casing or shoe, used now with an inflatable inner tube, may be used with the resilient structure which I have designed to take the place of the inner tube. A still further object is to so construct my improved tire that it may be used upon a demountable rim, thus giving such tire all the advantages which are found in the forms of tire now in use.

The improved structure constituting my invention comprises a pair of concentric metal rings connected at various points around their circumferences by means of wire strands or similar binding material, the rings being so shaped and spaced as to fit within standard tire casings or shoes of either the clencher or straight side types such as are used at the present time with inflatable inner tubes.

These and other features of my invention are more fully described hereinafter, reference being had to the accompanying drawings, in which:

Fig. 5, is a view of the connecting portion of the outer ring;

Fig. 6, is a sectional view of the outer ring on the line VI—VI, Fig. 5;

Fig. 9, is a sectional view, similar to Fig. 4, showing my improved construction as applied to a straight side tread and demountable rim;

Fig. 10, is a sectional view showing a slightly modified construction applicable to straight side treads;

Fig. 11, is a sectional view, similar to Figs. 4 and 9, showing a preferred form of demountable rim with which a tire embodying my invention may be employed;

Figs. 12 and 13, are views of a portion of the rim shown in Fig. 11, and

Fig. 14, is a cross sectional view of the wire clamping means.

Figure 1:
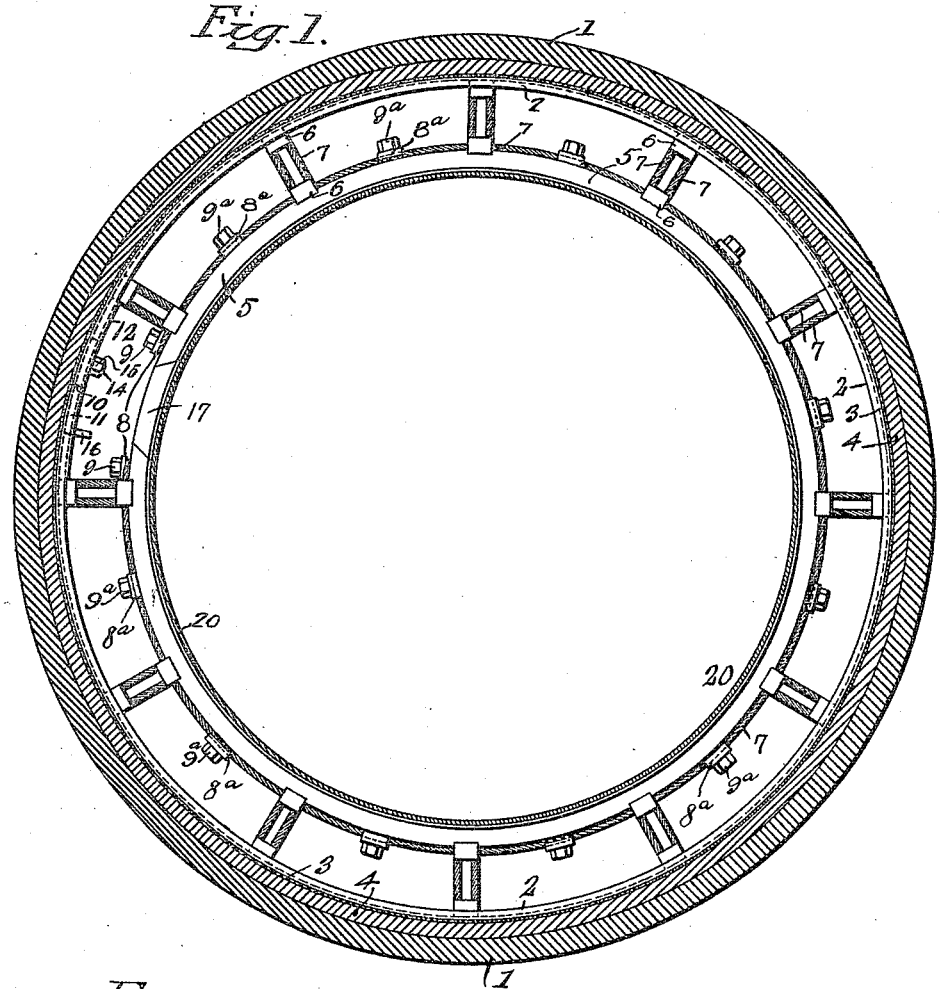
Figure 1, is a side elevation of the structure forming the subject of my invention; the tire casing and certain annular members within the same together with the rim being shown in section.
Figure 2:
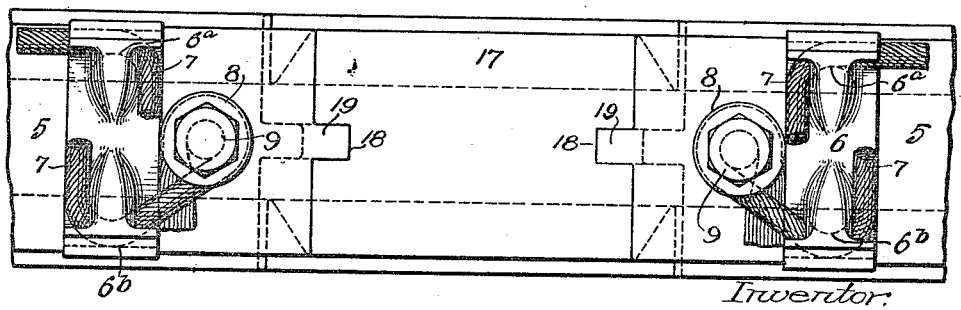
Fig. 2, is a view illustrating the joint of the inner ring of my improved structure.
Figure 3:
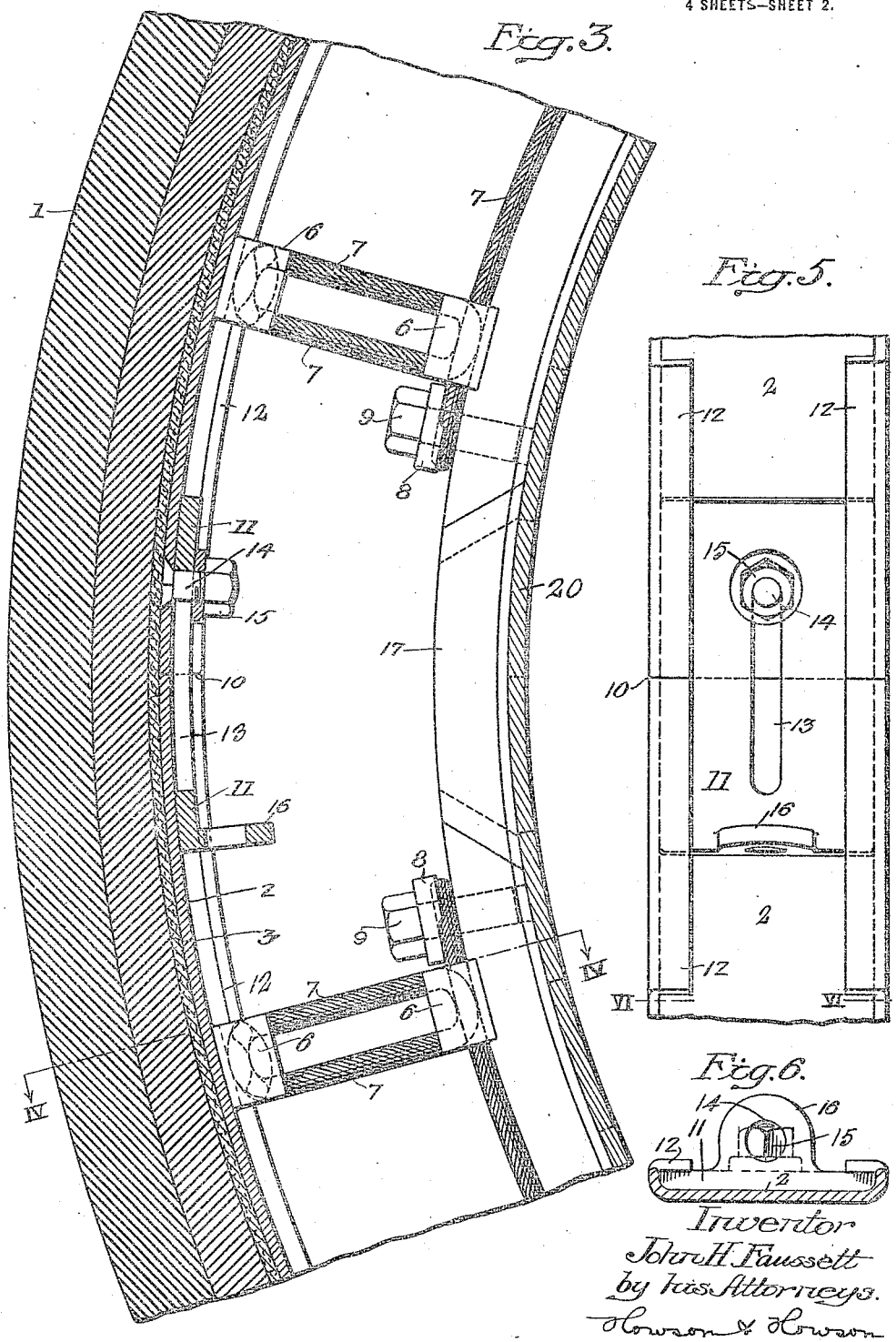
Fig. 3, is an enlarged view of a part of the structure shown in Fig. 1, partly in section on the line III—III, Fig. 4.

In the drawings, 1 is a tire casing or shoe of the standard clencher type. 2 is a metal ring which fits within the casing 1 and whose circumference is such as to permit a leather wearing strip 3, and a pad 4, of rubber or the like, to be interposed between said ring and the inner wall of the casing tread. Within the casing and inwardly disposed with respect to the ring 2 is a second ring 5; the two being concentric and spaced apart as shown, and the inner ring 5 being annularly recessed at the sides to receive the wedge-shaped inner edges of the casing lugs. Disposed at intervals around the inner side of the ring 2 and at corresponding intervals upon the outer side of the ring 5 are located cleat members 6, one of which is shown detached in Fig. 8. Between these cleat members extends, in the present instance, the wire rope 7 which connects the two rings 2 and 5 and which holds them in a substantially concentric position relative to each other. In the present case the rings are shown connected by a single wire rope 7, the ends of which are clamped securely to the inner ring by clamps 8 held by bolts or set screws 9; said rope extending between each set of cleat members upon the respective rings, and from set to set continuously.

Figure 4:
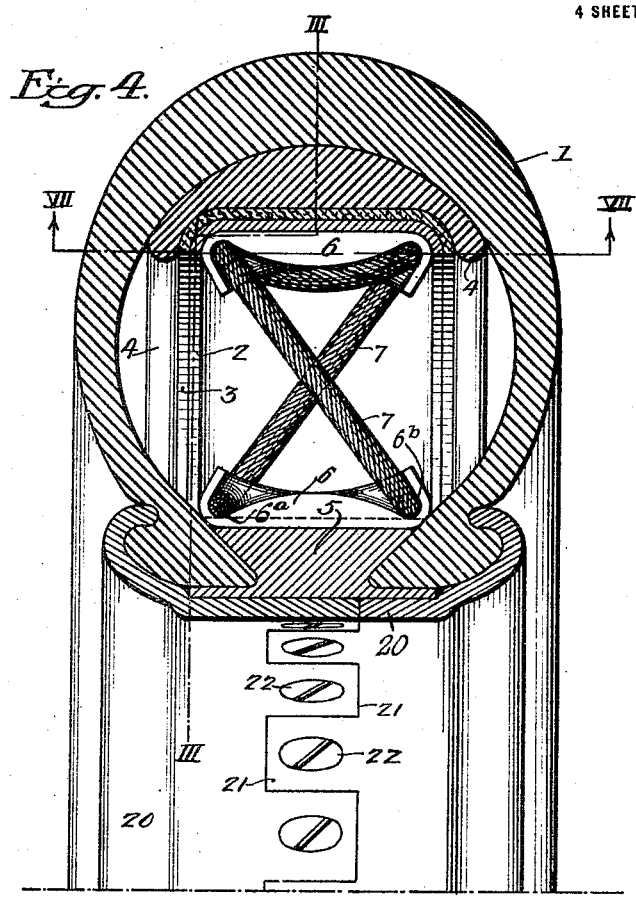
Fig. 4, is a cross sectional view on the line IV—IV, Fig. 3.
Figure 7:
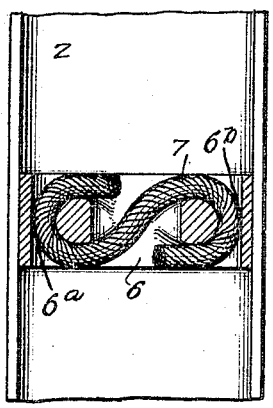
Fig. 7, is a view of part of the outer ring, showing one of the cleats carried thereby in section on the line VII—VII, Fig. 4.
Figure 8:
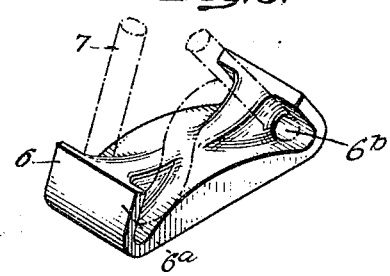
Fig. 8, is a view in perspective of one of the cleats or wire holding devices.

The construction of the cleat members 6 is clearly shown in Fig. 8. The wire rope passes through a hole $6^a$ at one side and passes across to a hole $6^b$ at the opposite side in an even S-shaped curve, there being no sharp angles or bends which might injure the strands of the rope. As shown in Fig. 4, the runs of the rope in crossing the space in the tire casing between the cleat members upon the two rings pass each other diagonally, and the cleats are so formed as to keep these diagonal runs of the rope separated so that there will be no rubbing action which would tend to cause wear. In order that a single rupture of the rope 7 may not affect the whole tire, clamps 8ª, similar to the clamps 8 and clearly shown in Fig. 14, are carried by the ring 5 and disposed between the cleats 6; said clamps being secured to the ring by set screws or bolts 9ª and serving to hold the rope 7 against displacement with respect to the ring.

In order that the ring 2 may be easily gotten into the casing, it is split at 10 which enables it to be contracted for insertion and then when in position within the casing the free ends of the ring are held in position by a clamp. In the embodiment of my invention shown in the drawings, this clamp consists of a plate 11 which is held by extended edges 12 of the ring which are beaded over to form a bearing in which the plate is adapted to slide, as clearly shown in Figs. 5 and 6. The plate 11 has a longitudinal slot 13 extending along its center through which extends a bolt 14 attached to the ring 2, and by means of a nut 15 on the end of the bolt the plate may be held firmly in the locking position. When it is desired to contract the ring the nut 15 is loosened and the plate 11 slid in its bearings,—the sliding action being permitted by the slot 13 through which the bolt passes,—until the end of the plate has passed the meeting ends of the ring at 10, when one end of the ring may be sprung out over the other end and the ring contracted. For ease in manipulating the plate 11 an apertured lug 16 is provided thereon.

In order that the plate 11 may be manipulated when the rings are in the casing, a portion 17 of the inner ring 5 is detachably mounted and has grooves or notches 18 at its ends into which tongues 19 on the ring 5 fit to prohibit any lateral displacement.

When the rings have been placed in the casing, the portion 17 is placed in position and the tire attached to the rim in the usual manner. Fig. 4 shows a form of demountable rim of the clencher type in which the rim 20 is divided into halves having interlocking portions 21. Screws 22 passing through the portions 21 and into the inner ring 5 hold the rim halves in position.

Figs. 9 and 10 show my invention applied to straight side casings. The construction is similar in every respect to that already described for clencher casings with the exception that there is a slight change in the form of the inner ring, indicated at 5ª and 5ᵇ for the accommodation of the edges of the casing. It will be seen that in either case the edges of the casings are held clamped between the inner rings 5ª or 5ᵇ and the sides of the demountable rims and there is no possibility of the edges slipping up over the sides of the rims. The rims 20ª and 20ᵇ shown in Figs. 9 and 10 are well known types of straight side demountable rims.

In Fig. 11 is shown a preferred form of rim for the clencher casings which consists of two portions 23 and 24, the portion 23 fitting within the portion 24 and each portion having a downwardly extending lug which, when in position, fits against the side of the wheel 25. A bolt 26, passing through the wheel and the lugs holds the rim to the wheel. A rim of this form is very easily applied to the tire and to the wheel, and may be used with the ordinary pneumatic tire if desired, in which case provision is made for the reception of a valve stem in the slots 27 and the hole 28.

A tire construction such as I have described combines the natural cushioning effect of the rubber tread and the pad 4 with the resilience of the outer metal ring 2 and the binding rope 7, and possesses a permanence not found in the pneumatic tire.

I claim:—

1. In a vehicle tire, the combination with a casing, of two rings concentrically arranged within the casing, a flexible connector for holding the rings in substantially concentric relation; said outer ring being split transversely, and adjustable clamping means disposed on the inner side of the free ends of said ring for holding the same together; said clamping means being capable of adjustment to permit release of said ring ends and to permit contraction of the ring when the ends are displaced.

2. In a vehicle tire, the combination with a casing, two rings concentrically arranged within said casing, a flexible connector for holding the rings in substantially concentric relation; said outer ring being split, adjustable clamping means for holding the free ends of said ring together; said clamping means being capable of adjustment to permit release of said ring ends and to permit contraction of the ring when the ends are separated, and flanges carried by said ring for receiving a member of the clamping means.

3. In a vehicle tire, the combination with a casing and a flanged rim upon which said casing is mounted, of two rings concentrically arranged within said casing, a flexible connector rigidly attached at intervals to both rings and holding the same in substantially concentric relation; the inner ring being shaped to receive the flanged edges of the casing and serving to clamp the same to the flanges of the rim, and a detachable bridging piece for said inner ring whereby it may be set in place and removed.

4. In a vehicle tire, the combination with a casing, of two rings concentrically arranged within said casing, cleats carried by said rings and disposed opposite each other, a flexible connector attached to both sets of cleats and holding the rings in substantially concentric relation, and means for holding the free ends of said connector.

5. In a vehicle tire, the combination with a casing, of two rings concentrically arranged within said casing, cleat members upon said rings, a single flexible connector having its ends attached to one of the rings and extending consecutively between the cleat members upon the rings, and means disposed between the cleat members for clamping said connector to one of the rings.

6. In a vehicle tire, the combination with a casing, of two rings concentrically arranged within said casing, cleat members upon said rings, a single flexible connector having its ends attached to one of the rings and extending consecutively between the cleat members upon the rings; said cleat members being apertured for the passage of said connector, and means disposed between the cleat members for clamping said connector to one of the rings.

7. In a vehicle tire, the combination with a casing, of two rings concentrically arranged within said casing, a flexible connector disposed between said rings, cleats carried by each of said rings at a plurality of points around their circumferences and disposed opposite each other through which the connector passes; said cleats being apertured therefor, and clamps carried by the inner ring for rigidly securing the connector thereto; said clamps being disposed between the cleats of said inner ring.

JOHN H. FAUSSETT.

Copies of this patent may be obtained for five cents each, by addressing the "Commissioner of Patents, Washington, D. C."